July 30, 1957  A. G. MAKELA ET AL  2,800,676
WINDSHIELD WIPER ARM AND BLADE ASSEMBLY
Filed Nov. 12, 1954  2 Sheets-Sheet 1
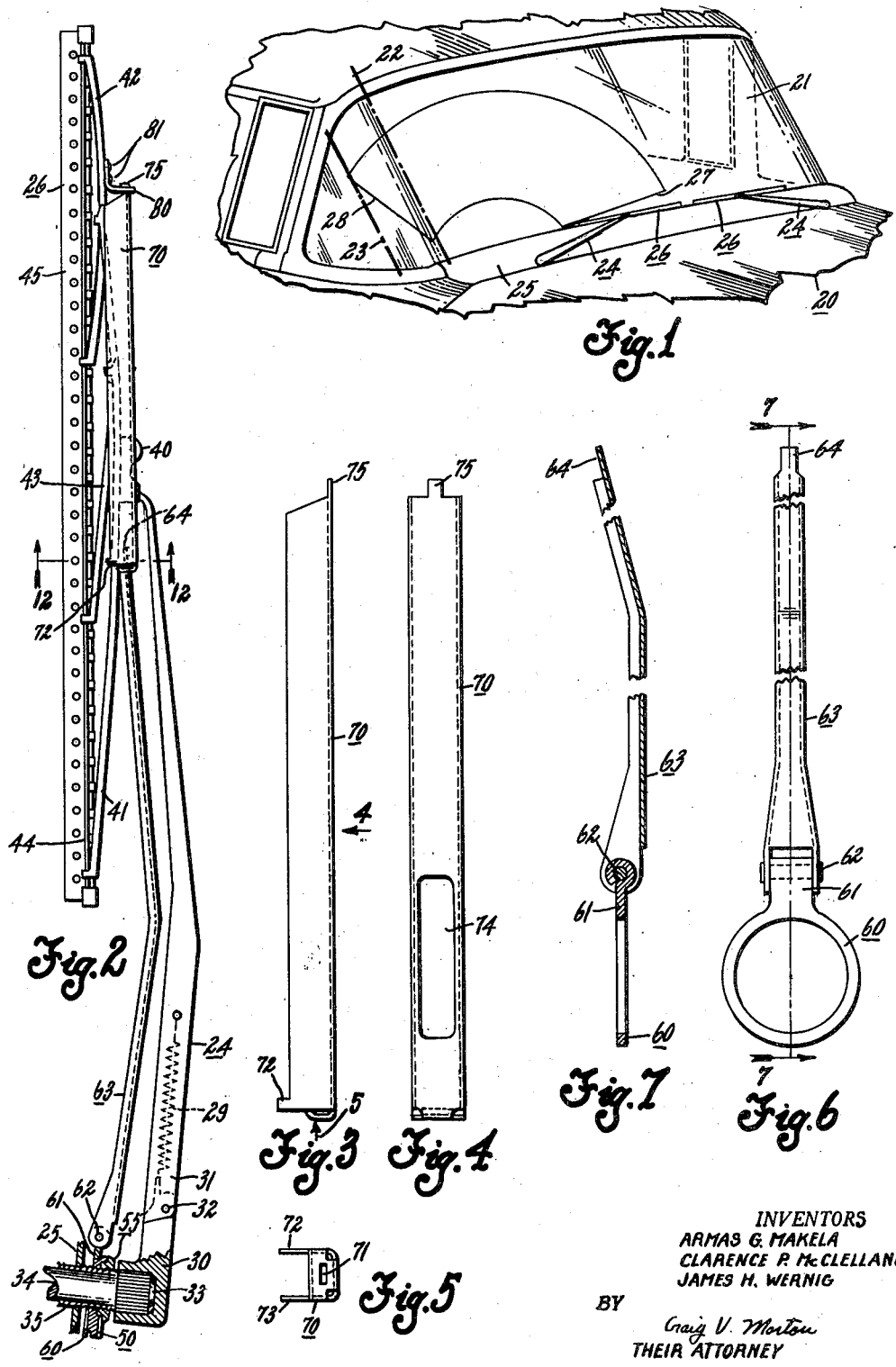
INVENTORS
ARMAS G. MAKELA
CLARENCE P. McCLELLAND
JAMES H. WERNIG
BY Craig V. Morton
THEIR ATTORNEY July 30, 1957  A. G. MAKELA ET AL  2,800,676
WINDSHIELD WIPER ARM AND BLADE ASSEMBLY
Filed Nov. 12, 1954  2 Sheets-Sheet 2
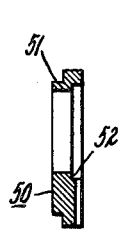
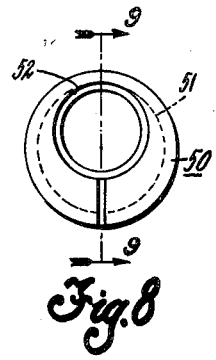
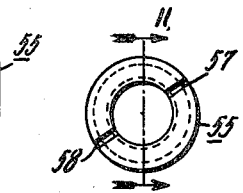
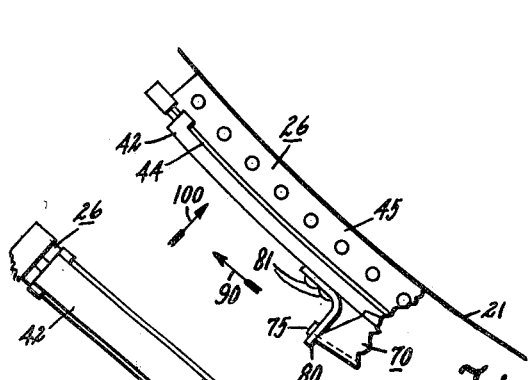
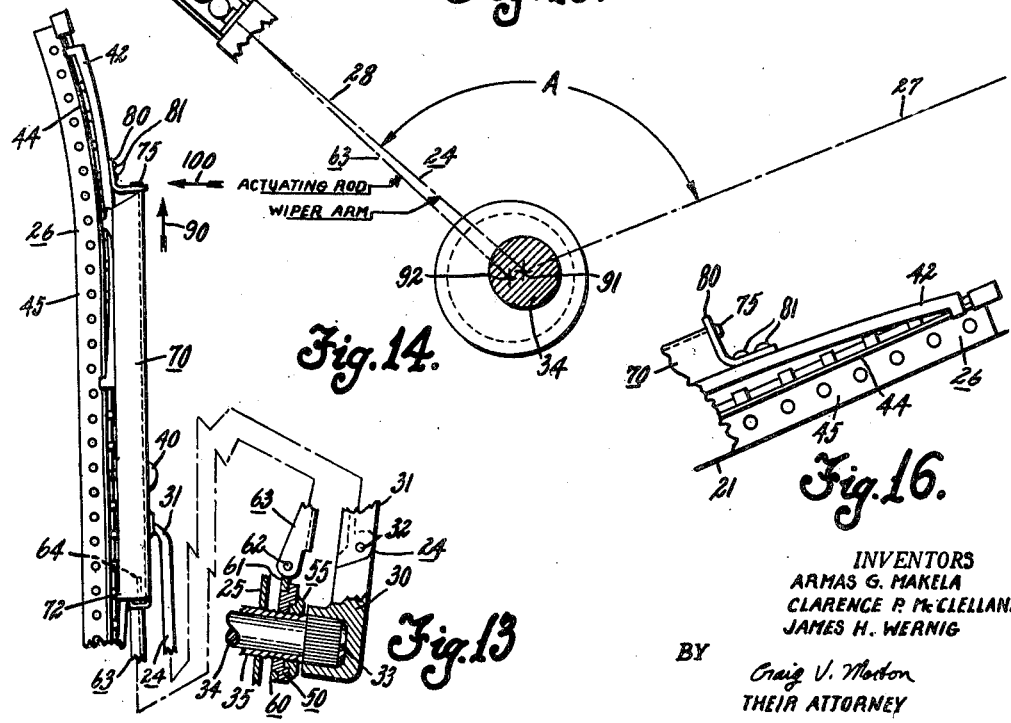
INVENTORS
ARMAS G. MAKELA
CLARENCE P. McCLELLAND
JAMES H. WERNIG
BY Craig V. Morton
THEIR ATTORNEY

United States Patent Office 2,800,676
Patented July 30, 1957

2,800,676

WINDSHIELD WIPER ARM AND BLADE ASSEMBLY

Armas G. Makela, Clawson, Clarence P. McClelland, Royal Oak, and James H. Wernig, Birmingham, Mich., assignors to General Motors Corporation, Detroit, Mich., a corporation of Delaware Application November 12, 1954, Serial No. 468,394

13 Claims. (Cl. 15—255)

This invention pertains to the art of window cleaning, and particularly to an improved arm and blade assembly for cleaning curved vehicular transparencies.

The inadequacy of present day wiper arm and blade assemblies for cleaning wrap around windshields having surfaces with compound curvature, is readily apparent to those skilled in the art. One of the principal faults of the wiping apparatus currently employed resides in the fact that the outer end portion, or tip, of the wiper blade tends to leave the windshield surface adjacent the outboard end of the wiping stroke. In other words, the blade does not readily conform to a surface having compound curvature, and, thus, fails to clean portions of the windshield during its wiping stroke. This difficulty is obviated in the present invention by incorporating means for applying additional pressure to the outer end of a wiper blade as it traverses a surface having compound curvature to insure wiping contact between the blade and the curved surface. Accordingly, among our objects are the provision of a wiper arm and blade assembly including automatically operable means for increasing the pressure applied to the outer end of a blade as it traverses a curved surface; the further provision of means for progressively varying the pressure applied to the outer end of a wiper blade during its wiping stroke; the further provision of a wiper arm and blade assembly including a reciprocable actuating rod for applying additional pressure to the outer end of a wiper blade; and the still further provision of a wiper arm and blade assembly including cam actuated means for varying the pressure applied to the outer end of a wiper blade during its wiping stroke.

The aforementioned and other objects are accomplished in the present invention by the provision of an actuating rod disposed beneath the wiper arm, the rod being oscillatable with the wiper arm and movable longitudinally relative thereto during oscillation of the arm. Specifically, the improved assembly includes a conventional arm having pivotally interconnected inner and outer sections, the inner section being adapted for connection to an actuating shaft and the outer section being adapted for connection to the outer blade. Similarly, the inner and outer sections of the arm are interconnected by suitable spring means for applying wiping pressure to the blade, and the outer section of the wiper arm is detachably connected to a clip carried by the primary pressure distributing member of the blade.

The blade, as disclosed herein, includes a pair of secondary pressure distributing members that are operatively connected to the primary pressure distributing member. One end of the primary pressure distributing member is movably connected to a flexible backing strip adjacent the inner end thereof, and the secondary pressure distributing members are, likewise, movably connected to longitudinally spaced points on the backing strip. One of the secondary pressure distributing members is in the form of a yoke, opposite ends of this yoke being movably connected to the backing strip adjacent the outer end thereof. The backing strip comprises a metal member which is freely flexible in a plane normal to the surface to be wiped, and substantially inflexible in a plane at right angles thereto. The backing strip carries a freely flexible squeegee of rubber, or rubber-like material, which is freely tiltable relative to the backing strip. The aforedescribed type of wiper blade, per se, is one of the conventional types currently being used and constitutes no part of this invention.

In order to improve the wiping operation of the conventional wiper blade and arm assembly aforedescribed, a bushing having an eccentric outer peripheral surface is fixedly attached to a sleeve bearing supported in the vehicle body, the actuating shaft for the wiper arm extending through the sleeve bearing. The eccentric surface of the bushing receives the hub of an actuating rod disposed beneath the wiper arm, the outer end of the actuating rod being operatively connected with the inner end of a channeled actuating member. The channeled actuating member is slidably supported on the primary pressure distributing member of the wiper blade. The outer end of the channeled actuating member is connected to a stop, or lug, attached to the yoke type secondary pressure distributing member of the blade. The stop constitutes a fixed reaction point for the rod and actuating member.

The eccentric bushing is arranged so that during oscillatory movement of the actuating rod, the arm, and the blade, the actuating rod will move longitudinally in an outward direction relative to the arm during movement of the wiper assembly from the inboard stroke end to the outboard stroke end. Conversely, during movement of the wiper assembly from the outboard stroke end to the inboard stroke end, the actuating rod will move longitudinally in an inward direction relative to the wiper arm. During outward longitudinal movement of the actuating rod, the channeled actuating member is thrust against the wiper blade carried stop, thereby resulting in the application of a force to the blade in a direction substantially normal to the surface being wiped, which force deforms the outer end of the blade, thereby resulting in a concave wiping edge. Inasmuch as this force is a maximum when the blade traverses the surface of maximum compound curvature, and this blade deforming force increases progressively as the blade traverses surfaces of progressively increasing curvature, the blade will be maintained in contact with the windshield surface throughout its entire wiping stroke. Conversely, during inward movement of the actuating rod, the blade deforming force decreases progressively inasmuch as the blade is traversing surfaces of progressively decreasing curvature.

Further objects and advantages of the present invention will be apparent from the following description, reference being had to the accompanying drawings wherein a preferred embodiment of the present invention is clearly shown.

In the drawings:

Fig. 1 is a fragmentary view, in elevation, of a vehicle including the improved windshield wiping apparatus of this invention.

Fig. 2 is a view, partly in section and partly in elevation, of a blade and arm assembly constructed according to this invention.

Fig. 3 is a side view, in elevation, of the channeled actuating member.

Figs. 4 and 5 are views, in elevation, taken in the direction of arrows 4 and 5, respectively, of Fig. 3.

Fig. 6 is a fragmentary view, in elevation, of the actuating rod.

Fig. 7 is a sectional view, taken along line 7—7 of Fig. 6.

Fig. 8 is a view, in elevation, of the eccentric bushing.

Fig. 9 is a sectional view taken along line 9—9 of Fig. 8.

Fig. 10 is a view, in elevation, of a retaining nut for the eccentric bushing.

Fig. 11 is a sectional view taken along line 11—11 of Fig. 10.

Fig. 12 is a sectional view taken along line 12—12 of Fig. 2.

Fig. 13 is a fragmentary view, partly in section and partly in elevation, of the wiper arm and blade assembly depicting the actuating rod in its extreme outward position with the outer end of the blade deformed.

Fig. 14 is a composite view illustrating operation of the improved wiper arm and blade assembly during the wiping stroke thereof.

Fig. 15 is a fragmentary view, in elevation, depicting the manner in which the actuating mechanism deforms the wiper blade at the outboard stroke end position.

Fig. 16 is a fragmentary view, in elevation, depicting the wiper blade and actuating assembly at the inboard stroke end position.

With particular reference to Fig. 1, the improved wiper arm and blade assembly of this invention is depicted in conjunction with a vehicle 20 having a transparency 21 which is commonly referred to as a wrap around windshield. The surfaces of maximum compound curvature on the windshield 21 are located between lines 22 and 23 on both the left and right-hand sides thereof. The vehicle 20 in a conventional manner includes a pair of oscillatable wiper arms 24, the inner ends of which are drivingly connected to actuating shafts, not shown in Fig. 1, which extend through the cowl, or rail portion, 25 of the vehicle. The outer ends of the arms 24 are detachably connected to wiper blades 26.

The wiping stroke of the blade 24 is diagrammatically illustrated in Fig. 1, the inboard stroke end being depicted by a line 27 and the outboard stroke end being depicted by a line 28. Furthermore inspection of the drawing will indicate that the outer portion of the blade 26 traverses a substantial portion of the surface of compound curvature located between lines 22 and 23. It has been observed that with conventional wiper arm and blade assemblies, the outer portion of the blade 26 tends to leave the surface of the windshield, thereby resulting in inadequate cleaning of the windshield surface portion of maximum compound curvature. The improved wiper arm and blade assembly of this invention assures that the outer portion of the blade 26 will be maintained in wiping contact with the windshield throughout its wiping sroke irrespective of the curvaure of the surface being traversed.

With particular reference to Fig. 2, the improved wiper arm and blade assembly includes a conventional wiper arm 24 having an inner spindle attaching section 30 and an outer blade attaching section 31. The sections 30 and 31 are pivotally interconnected by a pin 32, and in a conventional manner, are also interconnected by a spring 29 for applying wiping pressure to the blade 26. As shown in Fig. 2, the inner section 30 of the arm is drivingly connected with a spindle 33, which may be integral with an oscillatable actuating shaft 34 that is rotatably supported by a sleeve bearing 35 carried by the cowl portion 25 of the vehicle.

The outer end of the arm section 31 is detachably connected to a clip 40 of the blade 26. The blade 26, per se, is conventional, and, thus, the clip 40 is attached to a primary pressure distributing member 41. The outer end of the primary distributing member 41 is pivotally connected to an intermediate portion of a secondary pressure distributing member 43, the member 43 having its outer end pivotally interconnected to another secondary pressure distributing member, or yoke, 42. The inner end of the member 41 is movably connected to a flexible backing strip 44 at a point adjacent the inner end thereof. Similarly, the inner end of the member 43 is movably connected to the flexible backing strip 44, while both ends of the yoke 42 are movably connected to the flexible backing strip 44 adjacent the outer end thereof. The pressure distributing members of the blade 26 apply pressure to the backing strip at longitudinally spaced points, as is apparent from and inspection of Fig. 2. The backing strip is freely flexible in a plane normal to the surface to be wiped, and substantially inflexible in a plane at right angles thereto. The flexible backing strip 44 carries a rubber, or rubber-like squeegee element 45 which, according to conventional practice, is freely tiltable relative to the backing strip. The wiper arm and blade aforedescribed are conventional, and, hence, constitute no part of this invention. Furthermore, the use of the wiper arm and blade described is only exemplary, and is not to be construed as a limitation.

In order to improve the wiping efficiency of a conventional arm and blade assembly, a bushing 50 having an eccentric outer peripheral surface 51 is fixedly mounted on the vehicle, as depicted in Fig. 2. More particularly, the bushing 50 is supported on the external periphery of the sleeve bearing 35 and restrained against rotation relative thereto by means of a nut 55. As depicted in Figs. 8 through 11, the bushing 50 is formed with an enlarged annular groove 52 arranged to receive a reduced diameter portion 56 of the nut 55. The nut 55 is formed with a pair of diametrically opposed radial grooves 57 and 58 arranged to receive a tool for tightening the nut upon the sleeve 35. Thus, both the nut 55 and the eccentric bushing 50 remain stationary during oscillatory movement of the shaft 34, the arm 24 and the blade 26.

The eccentric, or cam portion 51 of the bushing 50 receives a hub 60 having a radial extension 61 which is pivotally connected by means of a pin 62 to a channeled actuating rod 63. The channeled actuating rod 63 is disposed beneath the arm 24. The outer end of the channeled rod 63 is formed with a tang 64, which is received in an opening 71 in the channeled actuating member 70. The channeled actuating member 70 is formed with spaced ears 72 and 73 that are clinched around the primary pressure distributing member 41 of the blade 26 so as to slidably support the actuating member 70 on primary pressure distributing member 41, as shown in Fig. 12.

As shown in Figs. 3 through 5, the actuating member 70 is also formed with an elongated slot 74 through which the clip 40 of the blade 26 extends. The slot 74 is of sufficient length to permit the necessary sliding movement of the channeled member 70 relative to the pressure distributing member 41 of the blade, as effected by the rod 63. The outer end of the actuating member 70 is formed with a tang 75 which extends through an opening in an L-shaped stop member 80 that is fixedly attached by rivets 81 to the yoke 42. The tang 75 is clinched to the stop member 80 so as to preclude relative movement therebetween.

With particular reference to Figs. 2 and 13 through 16, operation of the cam or eccentric actuated rod 63 and the member 70 will be described. The eccentric bushing 50 is fixedly attached to the vehicle so that when the blade 26 is at the inboard stroke end, as depicted by line 27 in Fig. 1, the radial portion 61 of the hub 60 is in alignment with the portion of surface 51 of the smallest eccentricity with relation to groove 52 of the bushing. Thus, the actuating rod 63 will be in its most inward position with respect to the wiper arm 24. However, when the wiper arm and blade have been moved to the outboard stroke end, as depicted by line 28 in Fig. 1, the radial portion 61 of the hub 60 will be in alignment with a portion of the surface 51 having a substantial eccentricity with respect to the groove 52 of the bushing. Thus, the actuating rod 63 will be in its most outward longitudinal position relative to the arm 24. During movement of the arm and blade from the inboard stroke end to the outboard stroke end, the rod 63 will move outwardly relative to the arm 24. Conversely, during movement of the arm and blade from the outboard stroke end to the inboard stroke end, the rod 63 will move inwardly relative to the arm 24. When the arm 63 is in its outermost longitudinal position with respect to the arm 24, as depicted in Fig. 13, the slidable actuating member 70 will apply a force to the outer end of the blade through the fixed reaction point, or stop 80 of the yoke 42 in a direction substantially perpendicular to the suface being wiped. In other words, by reason of the fact that the stop 80 is fixedly connected to the secondary pressure distributing member 42, outward movement of the actuating member 70 in the direction of arrow 90, in Fig. 13, is opposed by the stop 80, thereby resulting in the application of a force in the direction of arrow 100 to be applied to the secondary pressure distributing member 42 of the blade 26, which force deforms the outer end of the blade into a concave configuration, as depicted in Fig. 13. In this manner, the blade 26, and particularly the outer end thereof is maintained in contact with the windshield throughout its wiping stroke.

With reference to Figs. 14 through 16, the mode of operation of the improved wiper arm and blade assembly throughout its wiping stroke is depicted in composite form. Point 91 in Fig. 14 denotes the axis of rotation of the shaft 34 and the wiper arm 24, while point 92 denotes the center of rotation of the actuating rod 63, which is movable with the arm 24 and the blade 26 by reason of its connection with the blade carried actuating member 70. The shaft 34 is oscillatable throughout the angle A between the inboard stroke end 27 and the outboard stroke end 28. When the blade and arm are at the inboard stroke end, the blade is traversing a surface of only slight curvature and, thus, will readily conform to the surface without the application of additional pressure to the outer end of the blade. However, as the blade moves in a counterclockwise direction from the inboard stroke end to the outboard stroke end, as viewed in Fig. 14, the actuating rod 63, and, more particularly, the hub 60 thereof engages progressively increasingly eccentric portions of the bushing 50 so as to progressively increase the deforming force indicated by arrow 100 which is applied to the outer end of the blade. In this manner, wiping contact between the blade and the windshield is assured throughout the entire wiping stroke of the wiper blade.

From the aforegoing, it is readily apparent that the present invention provides means for increasing the wiping efficiency of present day wiper arm and blade assemblies. Moreover, the means disclosed are simple in nature and effective in operation.

While the embodiment of the present invention as herein disclosed, constitutes a preferred form, it is to be understood that other forms might be adopted.

What is claimed is as follows:

1. The combination with windshield wiper apparatus for cleaning a curved surface including an oscillatable wiper arm, a flexible wiper blade connected to one end of said arm for oscillation therewith, said arm including means for applying wiping pressure to said blade, and an actuating shaft connected to the other end of said arm for imparting an oscillatory stroke thereto having predetermined outboard and inboard stroke end positions; of means for applying additional wiping pressure to the outer end of said blade adjacent the outboard end position of its stroke so as to deform said blade into conformity with the surface to be cleaned.

2. The combination with windshield wiper apparatus for cleaning a curved surface including an oscillatable wiper arm, a flexible wiper blade connected to one end of said arm for oscillation therewith, said arm including means for applying wiping pressure to said blade, and an actuating shaft connected to the other end of said arm for imparting an oscillatory stroke thereto having predetermined outboard and inboard stroke end positions; of means for applying progressively increasing additional wiping pressure to the outer end of said blade from its inboard stroke end position to its outboard stroke end position so as to maintain said blade in contact with the surface to be cleaned.

3. The combination with windshield wiper apparatus for cleaning a curved surface including an oscillatable wiper arm, a flexible wiper blade connected to one end of said arm for oscillation therewith, said arm including means for applying wiping pressure to said blade, and an actuating shaft connected to the other end of said arm for imparting an oscillatory stroke thereto having predetermined outboard and inboard stroke end positions; of a rod disposed beneath said arm and movable longitudinally relative thereto, means operatively connecting one end of said rod with a fixed reaction point adjacent the outer end of said blade whereby longitudinal movement of said rod relative to said arm will result in the application of a force to said blade in a direction substantially normal to the surface to be cleaned, and means operatively engaging the other end of said rod for imparting outward longitudinal movement thereto during movement of said blade and arm from said inboard stroke end position to said outboard stroke end position.

4. The combination with windshield wiper apparatus for cleaning a curved surface including an oscillatable wiper arm, a flexible wiper blade connected to one end of said arm for oscillation therewith, said arm including means for applying wiping pressure to said blade, and an actuating shaft connected to the other end of said arm for imparting an oscillatory stroke thereto having predetermined outboard and inboard stroke end positions; of a rod disposed beneath said arm and movable longitudinally relative thereto, a member slidably supported on said blade and operatively interconnecting one end of said rod with a fixed reaction point adjacent the outer end of said blade whereby longitudinal outward movement of said rod applies a force to the outer end of said blade acting in a direction substantially normal to the surface to be cleaned, and cam means operatively engaging the other end of said rod for effecting outward longitudinal movement thereof when said arm and said blade are moved from the inboard stroke end position to the outboard stroke end position.

5. Windshield wiper apparatus for cleaning a curved surface including in combination, a flexible wiper blade having primary pressure distributing means, secondary pressure distributing means operatively connected with said primary pressure distributing means so as to receive pressure therefrom, a flexible backing element movably connected to said secondary pressure distributing means, and a readily conformable wiping member carried by said flexible backing element, a wiper arm having one end connected to said primary pressure distributing means, said arm including means for applying wiping pressure to said primary pressure distributing means, an oscillatable actuating shaft connected to the other end of said arm for imparting an oscillatory stroke thereto having predetermined inboard and outboard stroke end positions, and means for applying additional wiping pressure to said secondary pressure distributing means at the outer end of said blade adjacent the outboard stroke end position thereof so as to deform said blade into conformity with the surface to be cleaned.

6. Windshield wiper apparatus for cleaning a curved surface including in combination, a flexible wiper blade having a primary pressure distributing member, a plurality of secondary pressure distributing members operatively connected with said primary pressure distributing member so as to receive pressure therefrom, a flexible backing strip, said secondary pressure distributing members having operative connection with said flexible backing strip at longitudinally spaced points, and a readily conformable wiping element carried by said backing strip, a wiper arm having one end connected to said primary pressure distributing member, said arm including means for applying wiping pressure to said primary pressure distributing member, an oscillatable actuating shaft connected to the other end of said arm for imparting an oscillatory stroke thereto having predetermined inboard and outboard stroke end positions, and means for applying progressively increasing additional wiping pressure to one of said secondary pressure distributing members during movement of said blade and said arm between said inboard stroke end position and said outboard stroke end position.

7. Windshield wiper apparatus for cleaning a curved surface including in combination, a flexible wiper blade having a primary pressure distributing member, a plurality of secondary pressure distributing members operatively connected with said primary pressure distributing member so as to receive pressure therefrom, a flexible backing strip, said secondary pressure distributing members having operative connection with said flexible backing strip at longitudinally spaced points, and a readily conformable wiping element carried by said backing strip, a wiper arm having one end connected to said primary pressure distributing member, said arm including means for applying wiping pressure to said primary pressure distributing member, an oscillatable actuating shaft connected to the other end of said arm for imparting an oscillatory stroke thereto having predetermined inboard and outboard stroke end positions, one of said secondary pressure distributing members comprising a yoke having its intermediate portion pivotally connected to one end of another secondary pressure distributing member, opposite ends of said yoke being movably connected with said backing strip at longitudinally spaced points in the outer portion of said blade, and means for applying additional wiping pressure to said yoke adjacent the outboard stroke end position of said blade so as to insure contact between said wiping element and the surface to be cleaned.

8. Windshield wiper apparatus for cleaning a curved surface including in combination, a flexible wiper blade having a primary pressure distributing member, a plurality of secondary pressure distributing members operatively connected with said primary presure distributing member so as to receive pressure therefrom, a flexible backing strip, said secondary pressure distributing members having operative connection with said flexible backing strip at longitudinally spaced points, and a readily conformable wiping element carried by said backing strip, a wiper arm having one end connected to said primary pressure distributing member, said arm including means for applying wiping pressure to said primary pressure distributing member, an oscillatable actuating shaft connected to the other end of said arm for imparting an oscillatory stroke thereto having predetermined inboard and outboard stroke end positions, a rod disposed beneath said arm and movable longitudinally relative thereto, means connecting one end of said rod with a fixed reaction point on one of said secondary pressure distributing members whereby outward longitudinal movement of said rod will result in the application of a force to said blade in a direction substantially normal to the surface to be cleaned, and means operatively engaging the other end of said rod for imparting outward longitudinal movement thereto during movement of said blade and said arm between the inboard stroke end position and the outboard stroke end position.

9. Windshield wiper apparatus for cleaning a curved surface including in combination, a flexible wiper blade having a primary pressure distributing member, a plurality of secondary pressure distributing members operatively connected with said primary pressure distributing member so as to receive pressure therefrom, a flexible backing strip, said secondary pressure distributing members having operative connection with said flexible backing strip at longitudinally spaced points, and a readily conformable wiping element carried by said backing strip, a wiper arm having one end connected to said primary pressure distributing member, said arm including means for applying wiping pressure to said primary pressure distributing member, an oscillatable actuating shaft connected to the other end of said arm for imparting an oscillatory stroke thereto having predetermined inboard and outboard stroke end positions, a rod disposed beneath said arm and movable longitudinally relative thereto, a member slidably supported on said primary pressure distributing member and having operative connection with one end of said rod, means connecting said slidable member to a fixed reaction point on one of said secondary pressure distributing members whereby outward longitudinal movement of said rod and said slidable member will result in the application of a force to said one secondary pressure distributing member in a direction substantially normal to the surface to be wiped, and means operatively engaging the other end of said rod for imparting outward longitudinal movement thereto during movement of said blade and said arm between said inboard stroke end position and said outboard stroke end position.

10. In combination with a vehicle having a windshield with surfaces of compound curvature and a cowl portion disposed adjacent the lower edge thereof, an oscillatable actuating shaft extending through said cowl portion, a flexible wiper blade, a wiper arm having one end attached to said shaft and the other end connected to said blade, said wiper arm including means for applying wiping pressure to said blade, and means oscillatable with said blade and arm and operatively connected to said blade for applying additional pressure to the outer end of said blade as said blade traverses a surface with compound curvature so as to deform said blade into conformity with said surface of compound curvature.

11. In combination with a vehicle having a windshield with surfaces of compound curvature and a cowl portion disposed adjacent the lower edge thereof, bearing means supported in said cowl portion, an oscillatable actuating shaft supported in said bearing means, a flexible wiper blade, a wiper arm having one end attached to said shaft and the other end connected to said blade, said wiper arm including means for applying wiping pressure to said blade, a rod disposed beneath said arm and movable longitudinally relative thereto, eccentric means attached to said bearing means and operatively engaging said rod for imparting longitudinal movement thereto during oscillation of said arm and blade, and means interconnecting the other end of said rod and the outer end of said blade for applying progressively varying additional pressure to the outer end of said blade during oscillation of said blade and arm.

12. In combination with a vehicle having a windshield with surfaces of compound curvature and a cowl portion disposed adjacent the lower edge thereof, a sleeve bearing fixedly supported in said cowl portion, an oscillatable actuating shaft supported by said sleeve bearing and extending therethrough, a flexible wiper blade, a wiper arm having one end attached to said shaft and the other end connected to said blade whereby oscillation of said shaft will effect movement of said blade and arm between predetermined inboard and outboard stroke end positions, said wiper arm including means for applying wiping pressure to said blade, a rod disposed beneath said arm and movable longitudinally relative thereto, means connecting one end of said rod with said blade adjacent the outer end thereof whereby outward longitudinal movement of said arm will result in the application of a force to the outer end of said blade acting in a direction substantially normal to the windshield surface, and eccentric means fixedly attached to said sleeve bearing and operatively engaging the other end of said rod for imparting outward longitudinal movement to said rod during movement of said blade and arm between the inboard stroke end position and the outboard stroke end position.

13. The combination set forth in claim 12 wherein said flexible wiper blade includes a primary pressure distributing member to which said wiper arm is connected, a plurality of secondary pressure distributing members operatively connected with said primary pressure distributing member so as to receive pressure therefrom, a flexible backing strip movably connected to said secondary pressure distributing members, and a readily conformable wiping element carried by said backing strip, and wherein said means interconnecting one end of said rod and said wiper blade comprises a channeled member slidably supported on said primary distributing member and having a fixed reaction point on one of said secondary pressure distributing members.

References Cited in the file of this patent

UNITED STATES PATENTS

| | | |
|---|---|---|
| 2,537,411 | Klingler | Jan. 9, 1951 |
| 2,702,397 | Oishei | Feb. 22, 1955 |